United States Patent [19]

Mieling

[11] Patent Number: 4,651,431
[45] Date of Patent: Mar. 24, 1987

[54] WHEEL ALIGNING METHOD AND APPARATUS

[76] Inventor: James A. Mieling, 1030 Viking Ct., Batavia, Ill. 60510

[21] Appl. No.: 735,373

[22] Filed: May 17, 1985

[51] Int. Cl.⁴ ............................................. G01B 5/255
[52] U.S. Cl. ............................ 33/203.18; 33/180 AT
[58] Field of Search ...... 33/180 AT, 181 AT, 203.12, 33/203.13, 203.14, 203.15, 203.16, 203.18, 203.19; 248/649, 662, 188.2, 188.3

[56] References Cited

U.S. PATENT DOCUMENTS

| | | | |
|---|---|---|---|
| 2,281,769 | 5/1942 | Hochriem | 248/649 |
| 3,488,857 | 1/1970 | Bateman | 33/203.12 X |
| 4,453,315 | 6/1984 | Mosiman | 33/203.18 X |

Primary Examiner—Harry N. Haroian
Attorney, Agent, or Firm—Bernard L. Kleinke

[57] ABSTRACT

The wheel aligning method and apparatus relates to the replacing of the wheel to be aligned with the novel apparatus, which helps support the vehicle, and yet provides relatively easy access to the wheel strut assembly for alignment purposes. The apparatus includes a rigid member assembly adapted to be mounted on the strut assembly in place of the wheel, and a base assembly is pivotally connected to the rigid member assembly for resting on a supporting surface. The strut assembly is adjustable in height to enable the rigid member assembly and its base assembly to move adjustably relative to one another to adjust the overall height of the apparatus.

15 Claims, 8 Drawing Figures

WHEEL ALIGNING METHOD AND APPARATUS

TECHNICAL FIELD

The present invention relates in general to a method and apparatus for aligning vehicle wheels. The invention more particularly relates to such a wheel aligning apparatus and method to facilitate the alignment of strut-mounted wheels of front-wheel drive vehicles.

BACKGROUND ART

In the past, there have been many different types and kinds of devices for facilitating the aligning of vehicle wheels. For example, reference may be made to U.S. Pat. Nos. 4,337,581 and 3,488,857.

However, despite the heretofore known attempts to improve the wheel alignment techniques, such techniques have been awkward and time consuming, as well as less than entirely precise and accurate.

The commonly used techniques are particularly awkward, time consuming and inaccurate, where front-wheel drive, strut-mounted vehicles are concerned. In this regard, the currently used technique is to attach a camber gauge to the outside of the front wheel to be adjusted, and then the front wheels are turned outwardly to provide access to the strut assembly for adjustment purposes. Once an adjustment of the strut assembly is attempted, the wheels must be turned back to a parallel position to read the gauge to determine whether or not the camber is properly adjusted.

However, since the wheels are turned outwardly when the strut assembly is being adjusted, the camber adjustment can not be accurately and precisely made. Therefore, the process is repeated, and by trial and error, successive approximations are made until the desired camber alignment is achieved.

A toe adjustment is then attempted by replacing the camber gauge with a toe gauge. A similar awkward process must also be employed to accomplish the desired toe adjustment.

As an attempt to overcome some of these problems, the device shown U.S. Pat. No. 3,488,857 has been proposed to be used in place of the wheel to be aligned and to support the alignment guages. However, the device did not permit ready access to the strut assembly for adjustment purposes, and thus did not facilitate the alignment procedure to a sufficient extent. Moreover, the device is not suitable for the adjustment for all types of wheels, such as some modern wheels, not having eccentric adjustments.

Additionally, the patented device is pivotally mounted on a pair of legs to help accomplish the camber adjustment, but while the legs enable the pivotal movement to occur, the legs do not provide a suitable stable support surface for one-fourth the weight of a four-wheel vehicle, especially during the precise alignment operation.

Therefore, it would be highly desirable to have an apparatus and method for quickly and accurately aligning a strut-mounted front-wheel drive vehicle, without the need for such awkward and time consuming manipulations. In this regard, it would be very desirable to facilitate greatly the alignment process so that the alignment can be achieved in a fast and efficient manner, and yet the resulting alignment is highly accurate and precise.

The apparatus should provide ready access to the strut assembly for adjustment purposes. It should be capable of assisting the alignment of even the modern strut assemblies.

Such an apparatus should enable a camber adjustment to be made in a precise, stable manner, and yet the apparatus should readily and conveniently fit substantially all size vehicles.

It is also highly desirable to have such an apparatus which is adjustable to fit various different sizes of wheels for vehicles. Moreover, such an apparatus should be relatively inexpensive to manufacture.

DISCLOSURE OF INVENTION

Therefore, the principal object of the present invention is to provide a new and improved method and apparatus for facilitating the alignment of vehicle wheels in a highly expeditious and accurate manner.

Another object of the present invention is to provide such a new and improved wheel alignment apparatus, which is relatively inexpensive to manufacture and easy to use.

Briefly, the above and further objects of the present invention are realized by providing a wheel aligning method and apparatus to enable a relatively easy and highly accurate technique to be performed in far less time as compared to previously known procedures.

The wheel aligning method and apparatus relates to the replacing of the wheel to be aligned with the novel apparatus, which helps support the vehicle, and yet provides relatively easy access to the wheel strut assembly for alignment purposes. The apparatus includes a rigid member assembly adapted to be mounted on the strut assembly in place of the wheel, and a base assembly is pivotally connected to the rigid member assembly for resting on a supporting surface. The strut assembly is adjustable in height to enable the rigid member assembly and its base assembly to move adjustably relative to one another to adjust the overall height of the apparatus.

In this manner, the strut assembly can be adjusted quickly and accurately, without the necessity of cutting the wheel outwardly, since access can be readily gained to the strut assembly for adjustment purposes due to the relatively smaller size of the apparatus of the present invention. In this regard, the person performing the adjustment can simply reach over the upper rigid member assembly, which is sufficiently small in size, to permit the person to perform the adjustment and read the gauge, without the necessity of turning the front wheels outwardly. Thus, there is no need for a trial and error adjustment operation, and the resulting alignment is straight-forward and accurate.

The apparatus is also adjustable height-wise to accommodate vehicles with various sizes of wheels. The apparatus is composed of very few components, and thus is relatively inexpensive to manufacture.

According to one form of the present invention, the apparatus includes a position adjustment mechanism to enable the user to even more easily align the front wheels. The apparatus is also able to support either a camber gauge or a toe gauge.

BRIEF DESCRIPTION OF DRAWINGS

The above-mentioned and other objects and features of this invention and the manner of attaining them will become apparent, and the invention itself will be best understood by reference to the following description of an embodiment of the invention taken in conjunction with the accompanying drawings, wherein.

DETAILED DESCRIPTION

Figure 1:
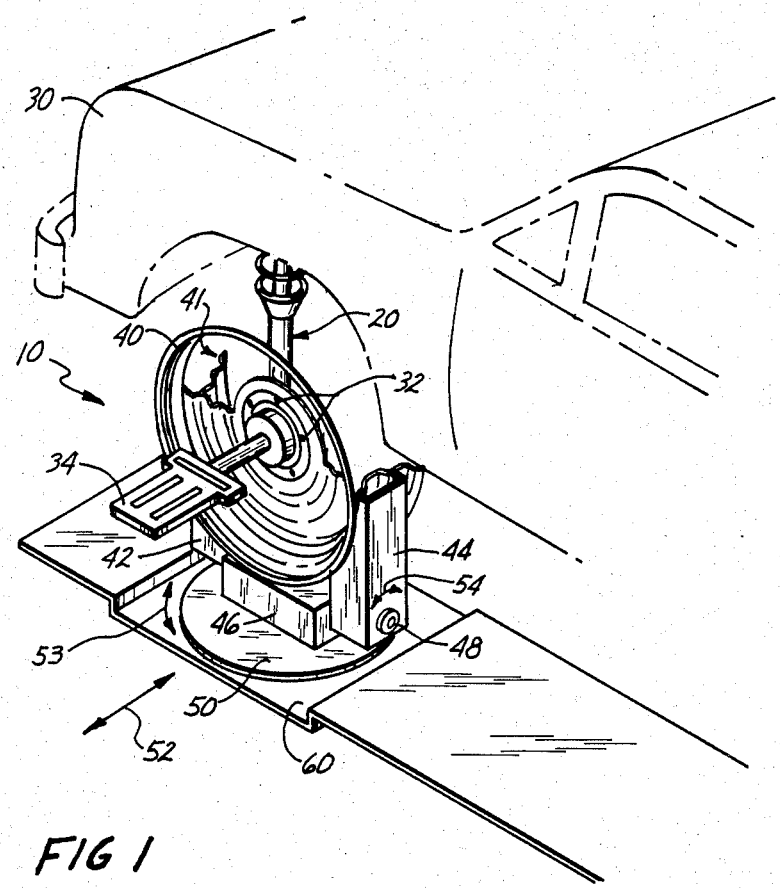
FIG. 1 is a perspective view of a wheel aligning apparatus, constructed in accordance with the invention shown on the left front wheel of an automobile.

Referring now to the drawings, and more particularly to FIGS. 1–4 thereof, there is shown a wheel aligning apparatus 10, constructed in accordance with the present invention. The apparatus is shown mounted on a front-wheel strut assembly 20 of a front-wheel drive vehicle 30, with bolts 32 in place of the vehicle's wheel (not shown). A camber adjustment device 34 is also attached to the strut assembly in the conventional manner.

The apparatus 10 generally comprises an upper rigid member assembly 40 having an access opening 41 that enables access to strut assembly adjustments subsequently described with reference to FIGS. 5–7. Vertical members 42 and 44 are attached to assembly 40 by suitable means such as welding. These vertical members are composed of a rigid material such as steel of sufficient strength to support the vehicle's weight supported by the strut assembly. Each vertical member includes a hole 45, that is aligned with the hole in base member 46, hole 47, through which pin 48 is inserted to pivotally mount base member 46 on vertical members 42 and 44. This arrangement enables apparatus 10 to support vehicle 30 on floating platform 50 which sets upon a support surface 60 (such as an alignment rack). Suitable means such, as roller bearings 51 in FIG. 3, enable floating platform movement on the support surface 60 during the alignment operation, both rectilinear movement in the directions indicated by arrow 52 and rotationaly movement in the direction indicated by arrow 53 (FIG. 1). This combines with pivoting of base 46 in the directions indicated by arrows 54 in FIG. 1 to facilitate the alingment operation.

Figure 2:
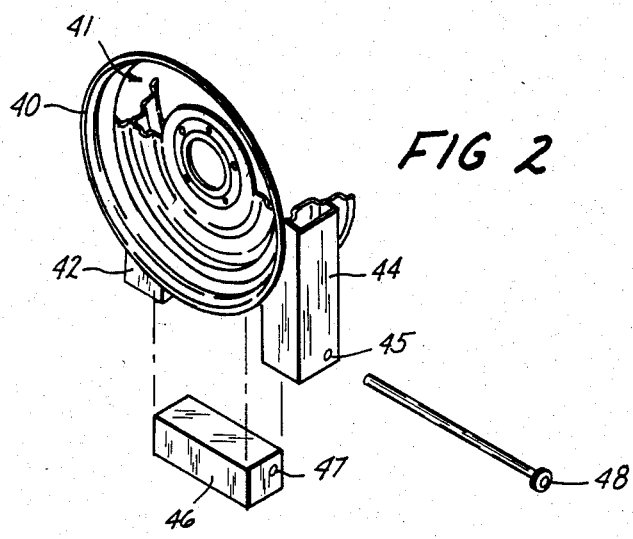
FIG. 2 is an exploded view of the apparatus of a portion of FIG. 1 showing the assembly of the base assembly.
Figure 3:
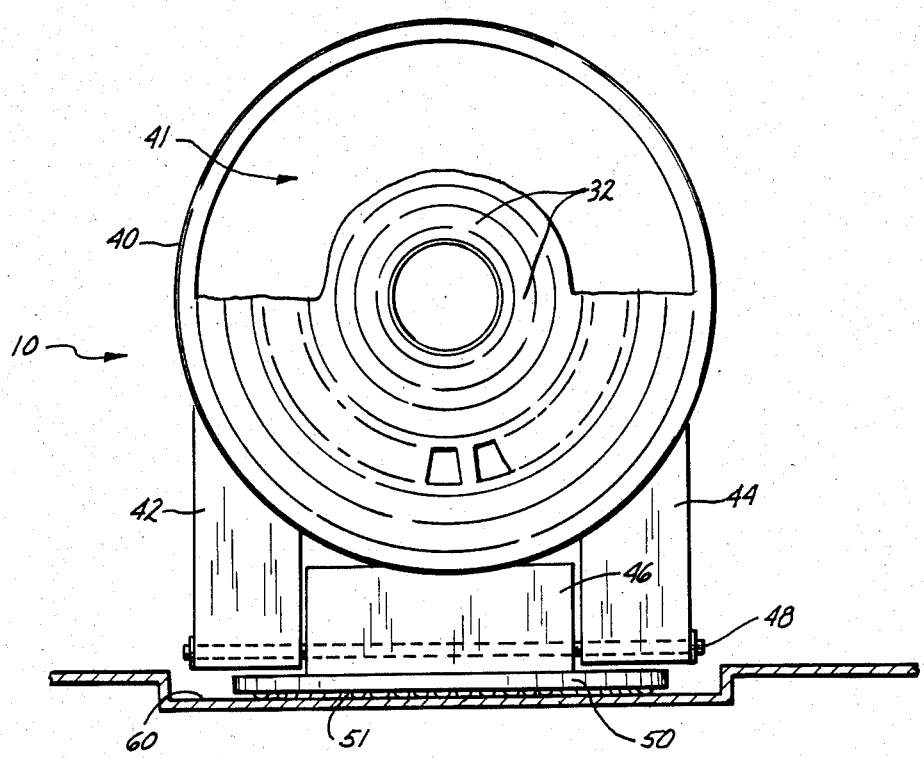
FIG. 3 is a side elevational view of the apparatus of FIG. 1.

Further details of the assembly of base member 46 with vertical members 42 and 44 is shown in FIG. 2. This allows base member 46 to pivot about pin 48, and this feature in combination with floating platform 50 enables base member 46 to move slightly as the camber of strut assembly 20 is adjusted. The base member 46 is an elongated block, which is rectangular (square) in cross-section throughout its length. It may be either solid or hollow.

Base member 46 pivots in the directions indicated by arrow 54 in FIG. 1 while floating platform 50 moves in the direction indicated by arrow 52 or camber adjustment. Rotational floating platform movement facilitates toe alignment by enabling rotationaly movement of the upper rigid member assembly 40 during alignment.

Figure 4:
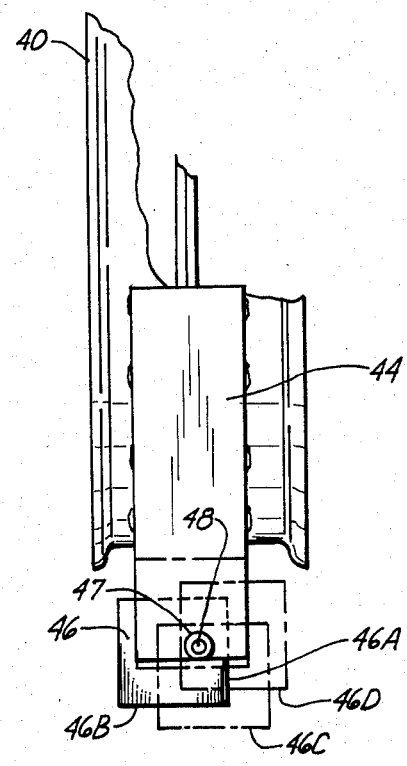
FIG. 4 is a front elevational view of the apparatus.

Referring now to FIG. 4, there is shown the height adjustment feature of the alignment apparatus. Hole 47 in the base member 46 is disposed in an off-center position in the base member. By pivoting the base member about pin 48 the base member can rest on a selected one of sides 46A, 46B, 46C, or 46D. And with hole 47 located at a different distance from each side, four different vertical positions can be selected, each one corresponding to one of the four sides while a four-sided member is preferred, it should be understood that many different multiple facted cross-sectional shapes may also be employed. For example, a six-sided configuration may also be used.

Thus, the pivotally mounted base member 46 provides height adjustment, as well as allowing pivotal camber adjustment of strut assembly 20. The apparatus can be adjusted for a given vehicle by simply grasping the base number 46 and rotating it manually about the offset longitudinal axis of the pin 48, until the desired one of the sides thereof face downwardly to provide the apparatus 10 with the correct overall height to match the height of other wheels (not shown) of the vehicle to be aligned. Such height adjustment can be made very quickly. Each one of the four sides of the base member 46 serve to grip the platform 50 over a substantial surface area (the entire surface area of the face of each side of the member 46). To further facilitate this gripping feature, a resilient cushion for padding (not shown) may be affixed to the outer surfaces of the four sides of the member 46.

Thus, member 46 provides the required pivotal action for camber adjustments for stable frictional gripping of the platform 50, and height adjustment to enable apparatus 10 to fit vehicles having various different sizes of wheels, all of these features are accomplished by a single, low-cost member. Such member also facilitates greatly the firm support required for the apparatus 10 during the camber adjustment when the apparatus pivots about pin 48, and shifts laterally on the platform 50. Thus, precise and accurate alignments can be readily achieved by the apparatus 10.

Figure 5:
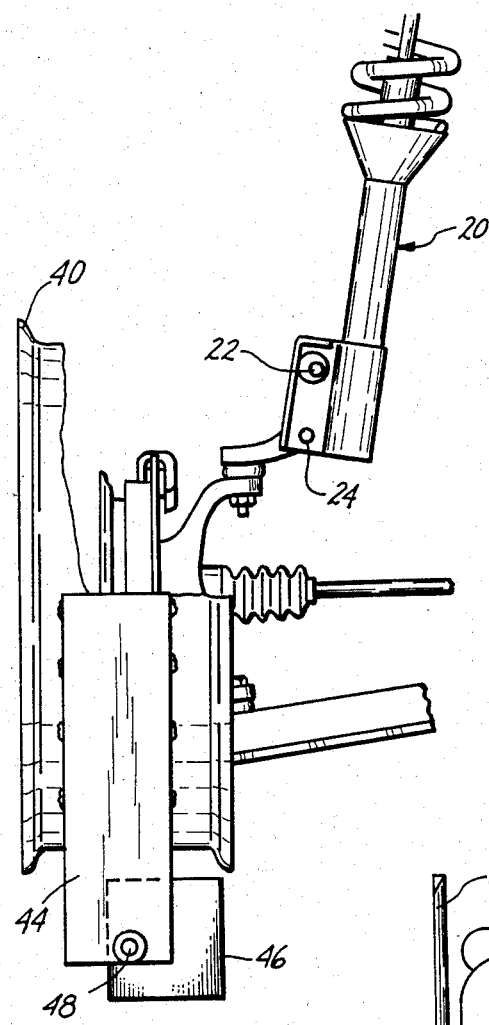
FIG. 5 is a rear elevational view of the apparatus, showing further details of a strut assembly having an adjustable eccentric.

Further details of strut assembly 20 are shown in FIG. 5. Strut assembly 20 is adjusted by loosening bolt 24 (FIG. 5) and adjusting eccentric 22 until the desired camber is achieved. Bolt 24 is then retightened with the camber adjustment completed and the need for iterative adjustment eliminated.

Figure 6:
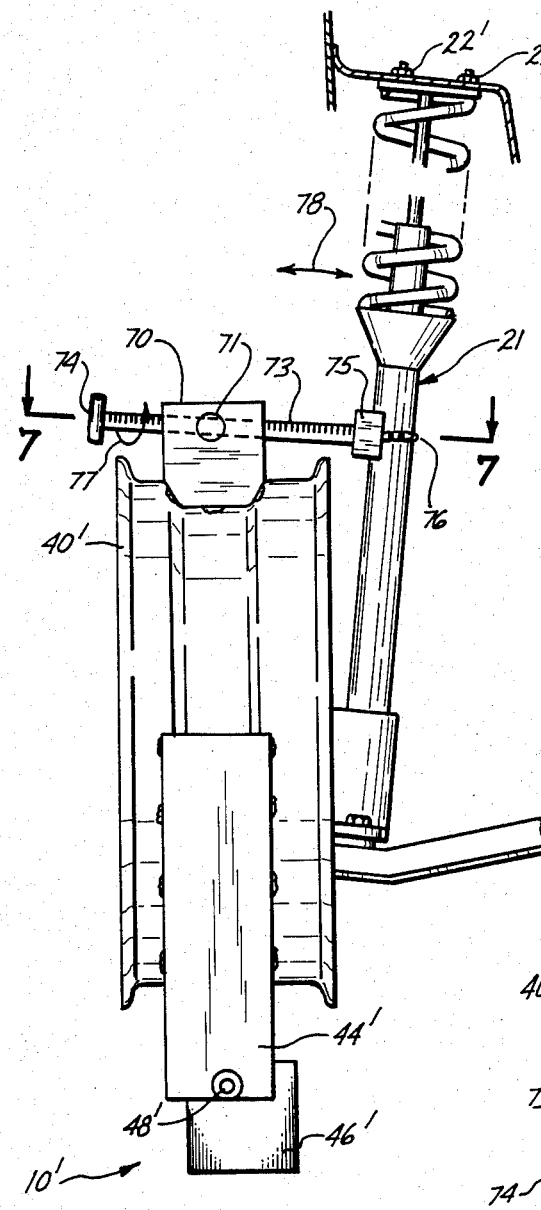
FIG. 6 is a rear elevational view similar to FIG. 5 of another inventive apparatus, showing a strut assembly that has no adjustable eccentric.
Figure 7:
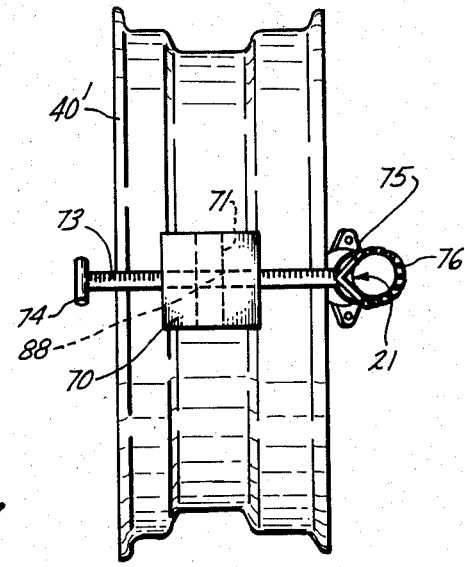
FIG. 7 is a sectional view taken on line 7—7 of FIG. 6.

Another and more modern type of strut assembly is illustrated in FIGS. 6 and 7. Strut assembly 21 is adjusted by loosening bolts 22' and 23 and sliding the strut assembly to the correct camber position and then retightening the bolts. The illustrated wheel alignment apparatus 10' includes an adjustment mechanism for use with such a strut assembly, and is similar to the apparatus 10. The prime notation for the various components of apparatus 10' correspond to like components of apparatus 10. It comprises a frame member 70 mounted fixedly to the top of upper rigid member assembly 40'. Pivot rod 71 is pivotally mounted transversely on frame member 70 a cross-threaded opening 88 to receive threaded shaft 73 which is rotatable with handle 74. A V-shaped bracket 75 attached to threaded rod 73 is fixed to strut assembly 21 by chain 76 wrapped about strut 21. With bolts 22' and 23 loosened, threaded rod 73 is rotated with handle 74 in the directions indicated by arrow 77 to move strut assembly 21 in the directions indicated by arrow 78 as member 40' pivots on base member 46' about pin 48' to a desired position to adjust the camber by utilizing a camber gauge (not shown) attached to the apparatus 10'. The bolts are then retightened to complete the operation without iterative repitition.

Thus, inventive apparatus enables quick and easy camber adjustment on various strut assemblies. It is composed of very few components so that it is relatively inexpensive to manufacture, and it is adjustable height-wise to accommodate vehicles with various sizes of wheels. Furthermore, there is no need for a trial and error adjustment operation, and the resulting alignment is straightforward and accurate.

Figure 8:
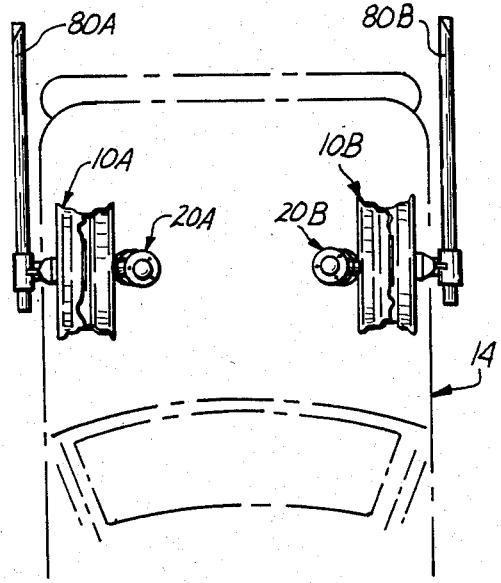
FIG. 8 is a top view of a portion of an automobile with another wheel alignment apparatus constructed according to the present invention, together with a like one, as well as a toe guage on each one thereof.

Similarly, the inventive apparatus is convenient for toe adjustment. The camber gauge is replaced with a conventional toe gauge as illustrated in FIG. 8, where apparatus 10A and apparatus 10B are shown mounted in place on front strut assemblies 20A and 20B in place of the vehicle's front wheels, with toe gauges 80A and 80B removably attached to each apparatus in the conventional manner. Apparatus 10A and 10B enable easy access to adjust the strut assemblies, while floating platform 50 enables rotational movement as the adjustments are made. Once alignment is completed, each apparatus is removed and replaced with the vehicle wheel.

While a particular embodiment of the present invention has been disclosed, it is to be understood that various different modifications are possible and are contemplated within the true spirit and scope of the appended claims. For example, different types and kinds of materials may be employed for the apparatus of the present invention. Also, different dimensions and shapes may be utilized for the apparatus of the present invention. There is no intention, therefore, of limitations to the exact abstract or disclosure herein presented.

I claim:

1. Wheel alignment apparatus comprising:
   support means including a pair of rigid, spaced-apart, upright support members;
   rigid member means mounted on said support members and adapted to be mounted to a strut assembly of a vehicle in place of one of its wheels; and
   base means pivotally attached to said rigid member means at the bottom thereof to enable said rigid member means and said base means to pivot relative to one another during adjustment of said assembly, said base means being adjustable in its height dimension to accommodate different size vehicle wheels, said base means being an elongated block having a sufficient length to extend substantially the entire distance between said upright support members and having a plurality of elongated sides for engaging a supporting surface, said base means including pivot means disposed in an off-center position relative to a central axis of said base means to enable it to be rotated about said axis to enable a selected one of said sides to face downwardly.

2. Wheel alignment apparatus according to claim 1, wherein said sides of base means includes a plurality of flat surfaces for engaging a supporting surface, and each one of said surfaces is disposed at a different distance from said pivot means to provide a different overall height of said device.

3. Wheel alignment apparatus according to claim 2, wherein said base means includes said elongated block is tubular throughout its length and is rigid.

4. Wheel alignment apparatus according to claim 2, wherein said block is solid and rigid throughout its length.

5. Wheel alignment apparatus according to claim 4, wherein said block is rectangular in cross-section throughout its length to provide four flat supporting-surface engaging surfaces.

6. Wheel alignment apparatus according to claim 5, wherein said block is square in its cross-sectional shape throughout its length.

7. Wheel alignment apparatus according to claim 1, wherein said rigid member means includes a generally circular rigid member having an opening therein for permitting access to the strut assembly for adjustment purposes.

8. Wheel alignment apparatus comprising:
   rigid member means adapted to be mounted to a strut assembly of a vehicle in place of one of its wheels;
   base means pivotally attached to said rigid member at the bottom side thereof to enable said rigid member means and said base means to pivot relative to one another during adjustment of said assembly, said base means being adjustable in its height dimension to accommodate different size vehicle wheels, said base means being an elongated block having a plurality of sides for engaging a supporting surface, said base means including pivot means disposed in an off-center position relative to a central axis of said base means to enable it to be rotated about said axis to enable a selected one of said sides to face downwardly;
   wherein said sides of the base means includes a plurality of flat surfaces for engaging a supporting surface, and each one of said surfaces is disposed at a different distance from said pivot means to provide a different overall height of said device;
   wherein said block is solid, rigid, and square in cross-section throughout its length to provide four flat supporting-surface engaging surfaces; and
   wherein said rigid member means includes clamping means adapted to be attached releasably to the strut assembly, and positioning means for moving said rigid member means toward and away from said clamping means to cause said rigid member to pivot about the pivotal connection to said base means for wheel adjustment purposes.

9. Wheel alignment apparatus according to claim 8, wherein said positioning means includes a manually rotatable handle adapted to be rotated by the hand of the user.

10. Wheel alignment apparatus according to claim 9, wherein said positioning means includes a pivot member mounted transversely on the top portion of said rigid member means, and a threaded rod fixed to said handle and engaging threaded into a threaded opening in said pivot member to enable said threaded rod to be rotated axially by said handle to move said pivot member and said rigid member means relative thereto.

11. Wheel alignment apparatus according to claim 10, wherein said clamping means includes a chain for wrapping about a portion of the strut assembly.

12. Wheel alignment apparatus according to claim 11, wherein said chain is connected to an end portion of said threaded rod, and said handle is connected to the opposite end thereof.

13. Wheel alignment apparatus according to claim 12, wherein said rigid member means includes a generally circular rigid member having an opening therein for permitting access to the strut assembly for adjustment purposes.

14. A method of aligning a vehicle wheel, comprising,
  using an apparatus comprising:
  rigid member means adapted to be mounted to a strut assembly of a vehicle in place of one of its wheels; and
  base means pivotally attached to said rigid member at the bottom side thereof to enable said rigid member means and said base means to pivot relative to one another during adjustment of said assembly, said base means being adjustable in its height dimension to accommodate different size vehicle wheels, said base means being an elongated block having a plurality of sides for engaging a supporting surface, sasid base means including pivot means disposed in an off-center position relative to a central axis of said base means to enable it to be rotated about said axis to enable a selected one of said sides to face downwardly;
  rotating said base means about its axis to position a desired one of said sides downwardly;
  removing a vehicle wheel; and
  mounting said apparatus in place of the removed wheel to facilitate strut adjustment.

15. Wheel alignment apparatus comprising:
  rigid member means adapted to be mounted to a strut assembly of a vehicle in place of one of its wheels;
  base means pivotally attached to said rigid member at the bottom side thereof to enable said rigid member means and said base means to pivot relative to one another during adjustment of said assembly, said base means being adjustable in its height dimension to accommodate different size vehicle wheels, said base means being an elongated block having a plurality of sides for engaging a supporting surface, said base means including pivot means disposed in an off-center position relative to a central axis of said base means to enable it to be rotated about said axis to enable a selected one of said sides to face downwardly; and
  wherein said rigid member means includes clamping means adapted to be attached releaseably to the strut assembly, and positioning means for moving said rigid member means toward and away from said clamping means to cause said rigid member to pivot about the pivotal connection to said base means for wheel adjustment purposes.

* * * * *